Patented Sept. 11, 1934

1,973,441

UNITED STATES PATENT OFFICE 1,973,441

HARD ALLOYS

Kurt Moers, Berlin - Charlottenburg, Karl Schroeter, Berlin - Lichtenberg, and Hans Wolff, Berlin, Germany, assignors to Fried. Krupp Aktiengesellschaft, Essen-on-the-Ruhr, Germany No Drawing. Application April 24, 1931, Serial No. 532,698. In Germany July 31, 1930

6 Claims. (Cl. 75—1)

This invention relates to sintered hard metallic alloys and methods for the manufacture thereof. Owing to the unusual hardness of boron carbide it has been proposed to make use of this for the manufacture of implements and tools and especially of boron carbide of the formula $B_6C$. Generally the boron carbide either alone or with the addition of small quantities of metals of high melting point or their carbides, such as tungsten, titanium, tungsten carbide or titanium carbide, is melted and then cast into a mould of suitable shape for the part or tool to be manufactured. This method of manufacture is, however, difficult on account of the high melting point of boron carbide and is not suitable for mass production, apart from the facts that the finished products do not always have a homogeneous structure and that their subsequent working involves substantial difficulties.

Attempts have also been made to manufacture sintered bodies by sintering pulverulent starting materials, for example boron nitride and carbon. Such products are extremely hard but are not very strong and are very porous. It has, therefore, also been proposed to produce boron carbide bodies of greater density by simultaneously pressing and sintering pulverulent boron carbide in moulds of boron nitride. This method of manufacture has the disadvantage that the moulds do not sufficiently withstand the necessary high pressures and simultaneous high temperatures, at any rate not for any length of time. Furthermore, this method involves production by units and not mass production.

The invention is based upon the discovery that hard, dense and rigid shaped bodies can be produced in a way eminently suitable for mass production by sintering if boron carbide is used as the main constitutent of the starting powder and one or more carbides of melting point exceeding 2000° C. are added to reduce the porosity, and in addition one or more metals of lower melting point are also added to lower the sintering temperature and to increase the toughness and strength of the alloy. The added substances, that is the carbides of high melting point and the metals of low melting point, must not together exceed 25% of the total mixture since if there is a greater percentage of added materials present the hardness of the finished product is unsatisfactory. The principal carbides of high melting point which may be used are those of silicon, vanadium, tungsten, molybdenum, titanium, hafnium and zirconium, while as the added metals of lower melting point nickel, cobalt, iron and chromium are especially suitable.

In carrying the invention into effect the boron may first be carburized in a carbon tube furnace traversed by hydrogen, in some cases also by hydrocarbon, until the carbon content approximately corresponds to that required by the formula $B_6C$. The necessary quantities of the carbides of high melting point and of the metals of lower melting point may then be added to the boron carbide in a state of sub-division as fine as possible. It is not, however, essential first to make the carbides of high melting point by a special process before they are added to the mixture. Equally good results can be obtained by adding the elements themselves and carburizing them during the sintering to form the desired carbides. The pressed bodies made from such a powder mixture are next sintered in a carbon tube furnace traversed by hydrogen. The materials added such as silicon, titanium, zirconium and so forth are then converted into carbides, while the iron, nickel, cobalt, chromium and the like also take up some carbon to retain their metallic character.

In a modification of the process elementary boron may be used partly or wholly in place of the other elements mentioned above to form carbides of high melting point for the purpose of reducing porosity.

Although with the novel composition of the starting mixture dense products can be produced simply by sintering the pressed powder bodies for a sufficiently long time, pressure may be employed during the sintering and this is found considerably to reduce the time taken by the process.

It is preferred to deprive the powder mixture of gases as completely as possible by subjecting it to high temperatures in vacuum before the pressing and also to carry through the sintering process in vacuum. The sintering need not be carried through in one working step but the pressed bodies may first be preliminarily sintered, then worked into the desired shape and only then subjected to the high temperature required for the final sintering.

In order that the invention may be clearly understood and readily carried into effect, one example of a process in accordance therewith will now be described.

Amorphous boron of as fine a grain as possible, obtained for example by the reduction of boron tri-oxide with magnesium and subsequent treatment with hydrochloric acid, is placed on supports which are as far as possible noncarbonizing, made for instance of tantalum carbide, in a carbon tube furnace. It is, thereupon, heated at about 1700° C. while the furnace is traversed by hydrogen or a mixture of hydrogen and hydrocarbons until a composition approximately corresponding to the formula $B_4C$ is attained. The resulting grey powder is then intimately mixed with about 5% of amorphous silicon of fine grain and 2.5% of iron powder of fine grain which has been reduced in hydrogen. The mixture is then carefully deprived of gases in vacuum at about 1350° C. and directly thereafter pressed into shaped bodies. The latter are next heated slowly to about 2000° C. in a carbon tube furnace traversed by dry hydrogen and as a result they attain so great a strength that they can easily be worked. After being worked into the desired shape the bodies are heated in the same conditions as before to about 2200 to 2300° C., this constituting the final sintering which is complete after about one hour.

The products made by means of the invention are so strong and tough in addition to being very hard that they can be used extensively as materials for implements and especially for tools of every kind, and in fact not only for use on metallic materials but also for use on glass, porcelain, insulating materials and hard mineral substances such, for instance, as rock crystal.

What we claim as our invention is:—

1. A sintered hard metallic alloy for use in forming implements and tools, consisting of boron carbide as the main constitutent with one or more carbides of melting point exceeding 2000° C. of the group consisting of silicon, vanadium, tungsten, molybdenum, titanium, hafnium and zirconium, in amount to reduce the porosity, and also one or more metals of lower melting point from the group consisting of nickel, cobalt, iron and chromium, in amount to lower the sintering temperature and to increase the toughness and strength, the maximum total of the additional carbides and metals present being 25%.

2. A sintered hard metallic alloy for use in forming implements and tools, consisting of boron carbide as the main constituent, with an addition of one or more of the carbides of silicon, titanium, and zirconium in amount sufficient to reduce the porosity of the alloy, and one or more metals of the iron group in amount sufficient to lower the sintering temperature and to increase the toughness and strength, the additional carbides and metals being present in a total amount of not over 25%.

3. The process of producing a sintered hard metallic alloy, which comprises adding to boron carbide powder about 5% of at least one element selected from the group consisting of silicon, titanium and zirconium, and about 2.5% of one or more metals of the iron group, and sintering and carburizing the mixture.

4. The process of producing a sintered hard metallic alloy, which comprises adding to boron carbide powder about 5% of silicon and about 2.5% of one or more metals of the iron group, and sintering and carburizing the mixture.

5. A sintered hard metallic alloy for use in forming implements and tools, consisting of at least 75% of boron carbide, at least about 7% of a carbide of at least one element selected from the group consisting of silicon, titanium, and zirconium, and at least about 2.5% of one or more metals of the iron group.

6. A sintered hard metallic alloy for use in forming implements and tools, consisting of at least 75% of boron carbide, at least about 7% of a carbide of at least one element selected from the group consisting of vanadium, tungsten, molybdenum, hafnium, silicon, titanium, and zirconium, and at least about 2.5% of one or more metals of the group consisting of iron, nickel, cobalt, and chromium.

KURT MOERS,
KARL SCHROETER,
HANS WOLFF.